March 2, 1971  B. A. PARSONS  3,566,704

TAP CLOSURE MEMBER OPERATING MECHANISMS

Filed March 20, 1969

INVENTOR
BERNARD ARTHUR PARSONS

By
Cushman, Darby & Cushman
ATTORNEYS

United States Patent Office 3,566,704
Patented Mar. 2, 1971

3,566,704
TAP CLOSURE MEMBER OPERATING MECHANISMS
Bernard Arthur Parsons, Walsall, England, assignor to IMI Developments Limited, Birmingham, England
Filed Mar. 20, 1969, Ser. No. 808,795
Claims priority, application Great Britain, Apr. 3, 1968, 16,021/68
Int. Cl. F16h 27/02
U.S. Cl. 74—89.15                    2 Claims

ABSTRACT OF THE DISCLOSURE

A tap closure member operating mechanism with a retaining nut and a head nut, one of which is made from plastics, each nut having a locking portion, the locking portions of the two nuts being in alignment in planes taken normal to the axes of the screw threads when the nuts are assembled together, and during unscrewing of the nuts, the locking portion of the plastics nut is resiliently compressed by the other locking portion so that the locking portions must pass one another and allow the unscrewing action.

BACKGROUND OF THE INVENTION

(1) Field of the invention

This invention relates to tap closure member operating mechanisms.

(2) Description of the prior art

In conventional tap construction, a closure member operating mechanism used for opening and closing a passage for fluid incorporates a head nut secured to a body of the tap, the head nut carrying a closure member operating means for moving the closure member to open or close the passage, and a retaining nut which is screw-threadably received upon the head nut for retaining the operating means in position. It would be convenient from the economic standpoint if at least one of the nuts could be moulded from a mouldable plastics material to avoid the expense of manufacturing conventional metal nuts. However, in the assembled condition of the two nuts, an axial load is imposed upon their inter-engaged screw threads which resists any unscrewing action and as known plastics materials have relatively high creep properties compared with metals normally used, it is expected that if one of the nuts was made of plastics then creep in the material would lessen the axial load and eventually lead to the unscrewing of the nuts during normal operation of the operating means.

An object of the present invention is to provide a tap closure member operating mechanism which either avoids or lessens this possibility.

SUMMARY OF THE INVENTION

According to the invention, a tap closure member operating mechanism comprises a retaining nut and a head nut one at least of which is made from a resilient plastics material, the nuts having complementary screw threads for screwing them together into desired assembled positions and each having at least one locking portion, the locking portions of the two nuts being relatively disposed so that, in said assembled positions, they are in alignment in planes taken normal to the axes of the screw threads, and said portions are movable out of their aligned positions during unscrewing of the nuts by an unscrewing force which urges the portions of the two nuts to act compressively against one another and causes resilient compression of the locking portion of the plastics nut to allow said portions to move axially into alignment and then rotationally beyond one another.

It is preferable that both the nuts are formed from plastics material. Further, in a preferred construction the screw thread of the head nut is an external thread which terminates at one end in a radially outwardly extending shoulder of the nut, and at least one locking portion is provided upon the shoulder in the form of a projection which extends axially of the thread from the shoulder, a recess or recesses being provided in an opposing surface of the retaining nut for accepting the projection during assembly of the nuts, a locking portion of the retaining nut being provided at its end opposing the shoulder, said end also having a projection receiving recess which with the locking portion lies in a common plane normal to the axis of the thread. The projection may have parallel axially extending sides or the sides may be tapered as they extend from the shoulder. The sides of the recess may similarly be parallel or tapered towards the base of the recess. Alternatively, the nuts may be provided with radially extending surfaces of sinuous configuration so that in the assembled condition of the nuts, these surfaces are in opposition with the peaks of the surface of each nut received within valleys of the other nut. In this case, the peaks of both the nuts form locking portions.

BRIEF DESCRIPTION OF THE DRAWINGS

One embodiment of the invention will now be described, by way of example, with reference to the accompanying drawings, in which.

DESCRIPTION OF THE PREFERRED EMBODIMENT

Figure 1:
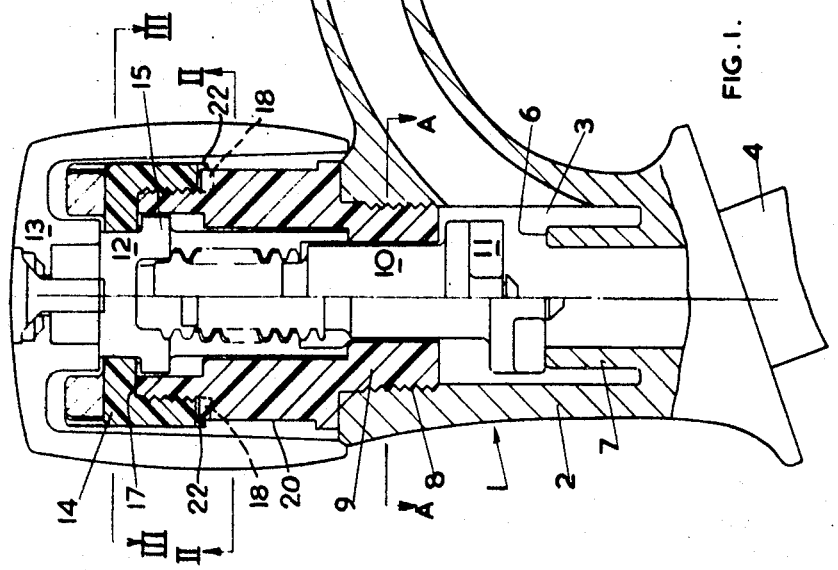
FIG. 1 is a side elevational view, partly in longitudinal cross-section, of a tap incorporating a closure member operating mechanism according to the invention.

As shown in FIG. 1, a tap has a tap body 1 formed from an acetal copolymer. The body is provided with a main portion 2 which has a passage 3 for the flow of water from a tail pipe 4 to an outlet passage 5 of the body. A closure member seating surface 6 is provided at one end of a cylindrical projection 7 surrounding the passage 3 at one position. The upper part of the body is provided with an internal screw thread 8 within which is secured the lower end of a head nut 9 which forms part of a tap closure member operating mechanism.

The head nut 9 and the remainder of the operating mechanism is also formed from an acetal copolymer. A closure member operating means comprises a closure member spindle 10 slidably received within the head nut, the spindle carrying at its lower end a closure member 11 in the form of a disc-shaped resilient rubber sealing member which, in a lower position of the spindle as shown in FIG. 1, fluid tightly seals against the seating surface 6. Axial movement of the spindle 10 is controlled by a closure operating spindle 12 of the operating means. The spindle 12 is rotatably, but non-axially movably, received within the upper end of the head nut and is operably connected to the spindle 10 to cause its axial movement, by an internal screw thread of the spindle 12 co-operating with an external thread at the upper end of a spindle 10. An operating knob 13 is secured to the upper end of the spindle 12 to allow for manual operation of the tap.

secured to the upper end of the spindle 12 to allow for manual operation of the tape.

A retaining nut 14 for retaining the spindle 12 axially in position relative to the head nut is secured to the head nut by an external screw thread of the head nut screw threadably engaged with a complementary thread of the retaining nut. The retaining nut overlies an annular flange 15 of the spindle 12 to retain it in position and a fluid-tight seal is located between the flange and the retaining nut.

Figure 3:
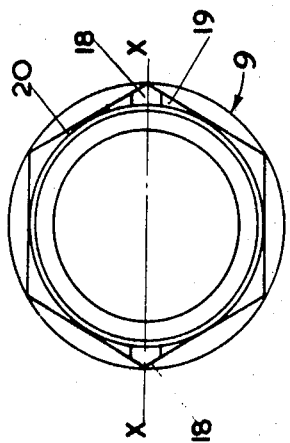
FIG. 3 is a view of one end of a head nut of the mechanism taken in the direction of section III—III in FIG. 1.
Figure 4:
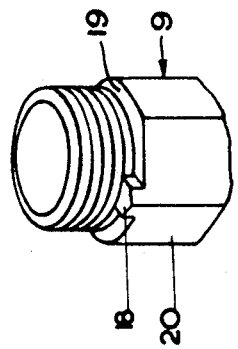
FIG. 4 is an isometric view of a part of the head nut.

In the assembled condition of the nuts, the retaining nut is securely received upon the head nut with radial surfaces 17 of the head nut and retaining nut in engagement so as to place an axial load upon the complementary screw threads. Because of the characteristics of creep of the plastics material of the two nuts, if the nut construction were conventional, there would be a tendency for this axial load progressively to become reduced so that eventually it would be found that this force had been reduced sufficiently to allow for rotation of the nuts in the unscrewing sense during normal operation of the spindle 12. To prevent this possibility, in this embodiment and according to the invention, locking portions are provided upon each of the nuts which only allow for the nuts to be unscrewed when positive steps are taken to disassemble the mechanism. In the case of the head nut as shown in FIG. 1, but more particularly in FIGS. 3 and 4, the locking portions consist of two projections 18 which extend axially from a radial shoulder 19 of the nut provided at the base of the screw thread. In this embodiment, the portion 20 of the head nut below the surface 19 is of hexagonal cross-section to assist in screw threadably assembling the head nut to the body. Conveniently, each projection 18 (FIGS. 3 and 4) is formed at the junction of two sides of the portion 20 of the nut so that the head nut may be made by an injection moulding process by using a method in which the mould halves have a separating line along line XX as shown in FIG. 3.

Figure 2:
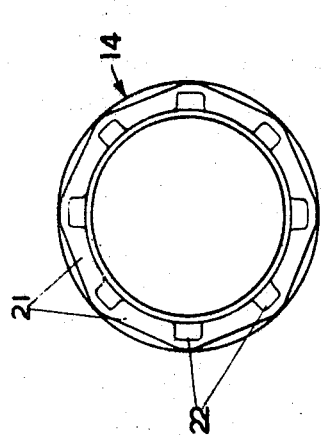
FIG. 2 is a view of one end of a retaining nut of the mechanism taken in the direction of cross-section II—II in FIG. 1.

The locking portions of the retaining nut (see FIGS. 1 and 2) comprise circumferentially spaced-apart portions 21 at the end surface of the retaining nut opposing the shoulder 19 of the head nut, the portions 21 being spaced apart by and defining axially extending recesses 22 which are equally spaced around the retaining nut. Each of these recesses is sufficiently large to accept a projection 18 while providing a clearance between the sides and base of the recess and the projection when the nuts are in assembled positions.

During assembly of the valve operating mechanism, after the spindles 10 and 12 have been located within the head nuts, the retaining nut is assembled onto the head nut and as the surfaces 17 approach one another the projections 18 engage the locking portions 21 of the retaining nut. Further screwing together of the two nuts is resisted by the engagement of the projections with the portions 21 but because of the resilient nature of the plastics material of both the nuts, the projections 18 and portions 21 are both axially compressed so that each projection is progressively moved from one aperture 22 to the next. In the final assembled positions as shown in FIG. 1, each projection 18 is received within one of the apertures 22 in alignment with the portions 21 in planes normal to the screw thread axes.

In use of the tap mechanism, because it is required resiliently to compress the projections and the portions 21 of the nuts to allow for their movement axially past one another during unscrewing of the nuts, then a greater unscrewing force is required to unscrew the nuts than is sufficient simply to overcome the axial load imposed upon the screw threads in the assembled position. Should, therefore, the plastics material in either or both of the nuts tend to creep so as to lessen the axial load imposed upon the threads, this will not allow for unintentional unscrewing of the threads as this will be resisted by the engagement of the projections with the portions 21. The reason for this is that any creep of the plastics material will only occur because of the axial load present in the threads in the assembled position of the nuts, and as the axial load required to resiliently compress the projections and portions 21 is not applied in the assembled position, creep in the plastics material will be insufficient to allow for unintentional unscrewing of the nuts.

Figure 5:
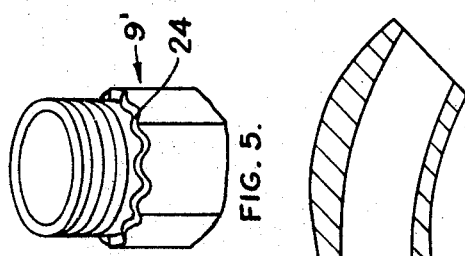
FIG. 5 is an isometric view of a part of a modified head nut.

In a modification of a head nut 9' shown in FIG. 5, the projections 18 on the shoulder 19 are not provided. In contrast, the radial surface is of sinuous configuration, as shown at 24, and has peaks of the sinuations spaced axially of valleys between the peaks. In this construction, the end surface of the retaining nut is not formed with recesses 22 but is also of sinuous configuration complementary to that of the shoulder radial surface. The peaks of the sinuous surfaces are the locking portions of the nuts and peaks of each nut are disposed within valleys of the surface of the other nut when the nuts are assembled together, with the sinuous surfaces intimately in contact. To unscrew the two nuts, a greater unscrewing force is required to move the peaks of the projections past one another in the unscrewing sense than is sufficient to overcome the axial load imposed upon the screw threads in the assembled position of the nuts. As in the first embodiment, therefore, any creep in plastics material of the nuts to lessen the axial load will be insufficient to allow for unintentional unscrewing of the nuts.

What is claimed is:

1. A tap closure member operating mechanism comprising a closure member operating means, a head nut carrying said operating means, and a retaining nut, at least one of said nuts being made from a resilient plastics material, the nuts having complementary screw threads and being assembled together into desired assembled positions with the retaining nut holding the operating means within the head nut, one of the nuts having an end surface with at least one locking portion formed as a projection extending axially from the end surface, and the other nut having an end surface opposing the end surface of said one nut, said opposing end surface having formed therein at least one axially extending projection-receiving recess, said other nut having parts on each side of and defining the recess, said parts being locking portions of said other nut, so that in the assembled positions of the two nuts, the locking portions of the nuts are in alignment in planes taken normal to the axes of the screw threads, and relative unscrewing rotation of the nuts urges the locking portions of the nuts to act compressively against one another to cause resilient compression of the locking portion of at least said one nut to allow said portions to move axially into alignment to impose an axial load upon the interengaged screw-threads, said portions then moving rotationally beyond one another.

2. A mechanism according to claim 1 wherein the screw thread of the head nut is an external screw thread and the head nut has a shoulder extending radially outwardly from one end of the screw thread and at least one projection extending axially from the shoulder, said projection being the locking portion of the nut, and the retaining nut has a surface opposing the shoulder, said surface being formed with at least one recess for accepting the projection during assembly of the nuts, the retaining nut also having parts on each side of and defining the recess, said parts being locking portions of the other nut.

References Cited

UNITED STATES PATENTS

| | | | |
|---|---|---|---|
| 2,355,166 | 8/1944 | Johanson | 151—9 |
| 3,042,067 | 7/1962 | Hidding | 74—424.8 |
| 3,353,718 | 11/1967 | McLay | 74—424.8 |

FOREIGN PATENTS

| | | | |
|---|---|---|---|
| 369,672 | 7/1963 | Switzerland | 151—10 |

FRED C. MATTERN, Jr., Primary Examiner
W. S. RATLIFF, Jr., Assistant Examiner